United States Patent
Karlinsky et al.

(10) Patent No.: US 12,541,685 B2
(45) Date of Patent: Feb. 3, 2026

(54) SEMI-SUPERVISED LEARNING OF TRAINING GRADIENTS VIA TASK GENERATION

(71) Applicant: International Business Machines Corporation, Armonk, NY (US)

(72) Inventors: Leonid Karlinsky, Mazkeret Batya (IL); Joseph Shtok, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 1451 days.

(21) Appl. No.: 17/121,149

(22) Filed: Dec. 14, 2020

(65) Prior Publication Data

US 2022/0188639 A1 Jun. 16, 2022

(51) Int. Cl.
  *G06N 3/082* (2023.01)
  *G06F 18/214* (2023.01)
  *G06N 3/045* (2023.01)

(52) U.S. Cl.
  CPC ......... *G06N 3/082* (2013.01); *G06F 18/2148* (2023.01); *G06F 18/2155* (2023.01); *G06N 3/045* (2023.01)

(58) Field of Classification Search
  CPC . G06F 18/2155; G06F 18/2148; G06N 3/045; G06N 3/082
  See application file for complete search history.

(56) References Cited

U.S. PATENT DOCUMENTS

| | | | |
|---|---|---|---|
| 2018/0053108 A1* | 2/2018 | Olabiyi | G06N 3/044 |
| 2018/0336471 A1* | 11/2018 | Rezagholizadeh | G06N 3/08 |
| 2019/0042945 A1* | 2/2019 | Majumdar | G06N 3/045 |
| 2019/0122097 A1* | 4/2019 | Shibahara | G06N 3/063 |
| 2019/0122120 A1 | 4/2019 | Wu et al. | |
| 2019/0201265 A1* | 7/2019 | Sayadi | A61B 5/4812 |
| 2020/0272897 A1* | 8/2020 | Ishii | G06N 3/088 |

OTHER PUBLICATIONS

Salimans, Tim, et al. "Improved Techniques for Training GANs" 2016 [Online] Downlaoded May 7, 2025 https://arxiv.org/pdf/1606.03498 (Year: 2016).*
Goodfellow, Ian. "NIPS 2016 Tutorial: Generative Adversarial NEtworks" 2017 [Online] Downloaded May 7, 2025 https://arxiv.org/pdf/1701.00160 (Year: 2017).*
Finn et al., "Model-Agnostic Meta-Learning for Fast Adaptation of Deep Networks", Cornell University Library, arXiv, Jul. 18, 2017, 13 pages, <https://arxiv.org/abs/1703.03400>.
Gidaris et al., "Boosting Few-Shot Visual Learning with Self-Supervision", Cornell University Library, arXiv, Jun. 12, 2019, 12 pages, <https://arxiv.org/abs/1906.05186>.

(Continued)

*Primary Examiner* — Ben M Rifkin
(74) *Attorney, Agent, or Firm* — Scott Dobson (57) ABSTRACT

In an approach for augmenting a neural network with a self-supervised mechanism, a processor trains a first neural network using labeled data, the first neural network configured for a main task. A processor trains a second neural network using the labeled data and unlabeled data, the second neural network being an additional component to the first neural network. A processor computes a gradient using a second loss of the second neural network based on the unlabeled data.

9 Claims, 7 Drawing Sheets

(56) References Cited

OTHER PUBLICATIONS

Jackson et al., "Semi-Supervised Learning by Label Gradient Alignment", Cornell University Library, arXiv, Feb. 6, 2019, 12 pages, <https://arxiv.org/pdf/1902.02336.pdf>.

Kaizuka, Hiroshi, "Gradient-based Data Augmentation for Semi-Supervised Learning", Cornell University Library, arXiv, Apr. 12, 2020, 18 pages, <https://arxiv.org/pdf/2003.12824.pdf>.

Lin et al. "Learning to Self-Train for Semi-Supervised Few-Shot Classification", Proceedings of the 33rd Conference on Neural Information Processing Systems (NeurIPS 2019), Vancouver, Canada, Dec. 8-14, 2019, 11 pages, <https://papers.nips.cc/paper/9216-learning-to-self-train-for-semi-supervised-few-shot-classification.pdf>.

Liu et al., "Exploiting Unlabeled Data in CNNs by Self-supervised Learning to Rank", IEEE Transactions on Pattern Analysis and Machine Intelligence, vol. 41, No. 8, Aug. 2019, 18 pages, <https://arxiv.org/pdf/1902.06285.pdf>.

Spyros et al., "Unsupervised Representation Learning by Predicting Image Rotations", Cornell University Library, arXiv, Mar. 21, 2018, 16 pages, <https://arxiv.org/abs/1803.07728>.

Vu, Chen, "Train without labeling data using Self-Supervised Learning by Relational Reasoning", Towards Data Science, Aug. 2020, 14 pages, <https://towardsdatascience.com/train-without-labeling-data-using-self-supervised-learning-by-relational-reasoning-b0298ad818f9>.

Zhai et al., "S4L: Self-Supervised Semi-Supervised Learning", Proceedings of the 2019 IEEE/CVF International Conference on Computer Vision (ICCV), Oct. 27-Nov. 2, 2019, Seoul, South Korea, 10 pages, <https://ieeexplore.ieee.org/search/searchresult.jsp?newsearch=true&queryText=S4L:%20Self-Supervised%20Semi-Supervised%20Learning>.

\* cited by examiner

SEMI-SUPERVISED LEARNING OF TRAINING GRADIENTS VIA TASK GENERATION

BACKGROUND

The present disclosure relates generally to the field of machine learning, and more particularly to designing a neural network architecture and objective function to augment a neural network with a self-supervised mechanism capable of generating useful gradients using unlabeled data.

Semi-supervised learning describes a class of algorithms that seek to learn from both unlabeled and labeled samples, typically assumed to be sampled from the same or similar distributions. Approaches differ on what information to gain from the structure of the unlabeled data. Self-supervised learning is a general learning framework that relies on surrogate (pretext) tasks that can be formulated using only unsupervised data. Neural networks may be trained using an optimization process that requires a loss function to calculate the model error. Cross-entropy and mean squared error may be types of loss functions to use when training neural network models. A deep learning neural network learns to map a set of inputs to a set of outputs from training data. Neural networks may be trained using stochastic gradient descent and require choosing a loss function when designing and configuring a model. A neural network model may be trained using the stochastic gradient descent optimization algorithm and weights may be updated using the backpropagation of error algorithm.

SUMMARY

Aspects of an embodiment of the present disclosure disclose an approach for augmenting a neural network with a self-supervised mechanism. A processor trains a first neural network using labeled data, the first neural network configured for a main task. A processor trains a second neural network using the labeled data and unlabeled data, the second neural network being an additional component to the first neural network. A processor computes a gradient using a second loss of the second neural network based on the unlabeled data.

DETAILED DESCRIPTION

The present disclosure is directed to systems and methods for designing a neural network architecture and objective function to augment a neural network with a self-supervised mechanism capable of generating useful gradients using unlabeled data.

Embodiments of the present disclosure recognize a need for a generic scheme for semi-supervised learning with a subnetwork generating self-supervised tasks, defined in a low-level term of machine learning for neural networks, rather than tailored to some high-level task. Semi-supervised and self-supervised learning may be types of machine learning methods using unlabeled data, additional to a main task, to improve the system performance on the main task. There are very few aspects one can find in common of these methods, as these methods may differ significantly between the fields of learning and tasks, but one property is that these methods are all explicitly designed—via an algorithm, a network architecture, a reasoning—for a specific goal. Embodiments of the present disclosure disclose semi-supervised learning methods using unlabeled data to improve performance of models trained on the available labeled samples. Embodiments of the present disclosure disclose automatizing the generation of self-supervised tasks, in the way that will boost the main task, using unlabeled data, with no explicit hand-made loss expressing some beliefs about the data. Embodiments of the present disclosure disclose that gradients, propagated from an additional component to a common subnetwork, contribute to reduction of a main objective function ("loss") value. Embodiments of the present disclosure disclose a general design of a system in which a proposed additional network module may hallucinate classification tasks and may generate gradients stemming from the loss function.

Embodiments of the present disclosure disclose an architecture for neural networks, which may include a gradient generating subnetwork added to a given standard network, solving a (main) task of the standard network, with a (main) loss function of the standard network. Embodiments of the present disclosure disclose designing a gradient generating subnetwork to train on unlabeled data. Embodiments of the present disclosure disclose generating and solving self-supervised tasks by using an internal loss function of the gradient generating subnetwork. Embodiments of the present disclosure disclose adding a mixed loss function to the total network and training a gradient generating subnetwork to produce "useful gradients" propagating from the internal loss function. The "usefulness" is intended in the sense the gradients (generated on unlabeled samples) help reduce the value of the main loss of the main network (on the labeled samples). Embodiments of the present disclosure disclose adding a subnetwork trained to produce helpful gradients. Embodiments of the present disclosure disclose a type of self-supervised task, one that is implicitly generated by a gradient generating subnetwork, is adapted to the main task, and can change along the training process. Embodiments of the present disclosure disclose a gradient generating subnetwork generating self-supervised tasks trained to optimize not the subnetwork's own loss, but the loss benefiting a main task of a common subnetwork.

Figure 1:
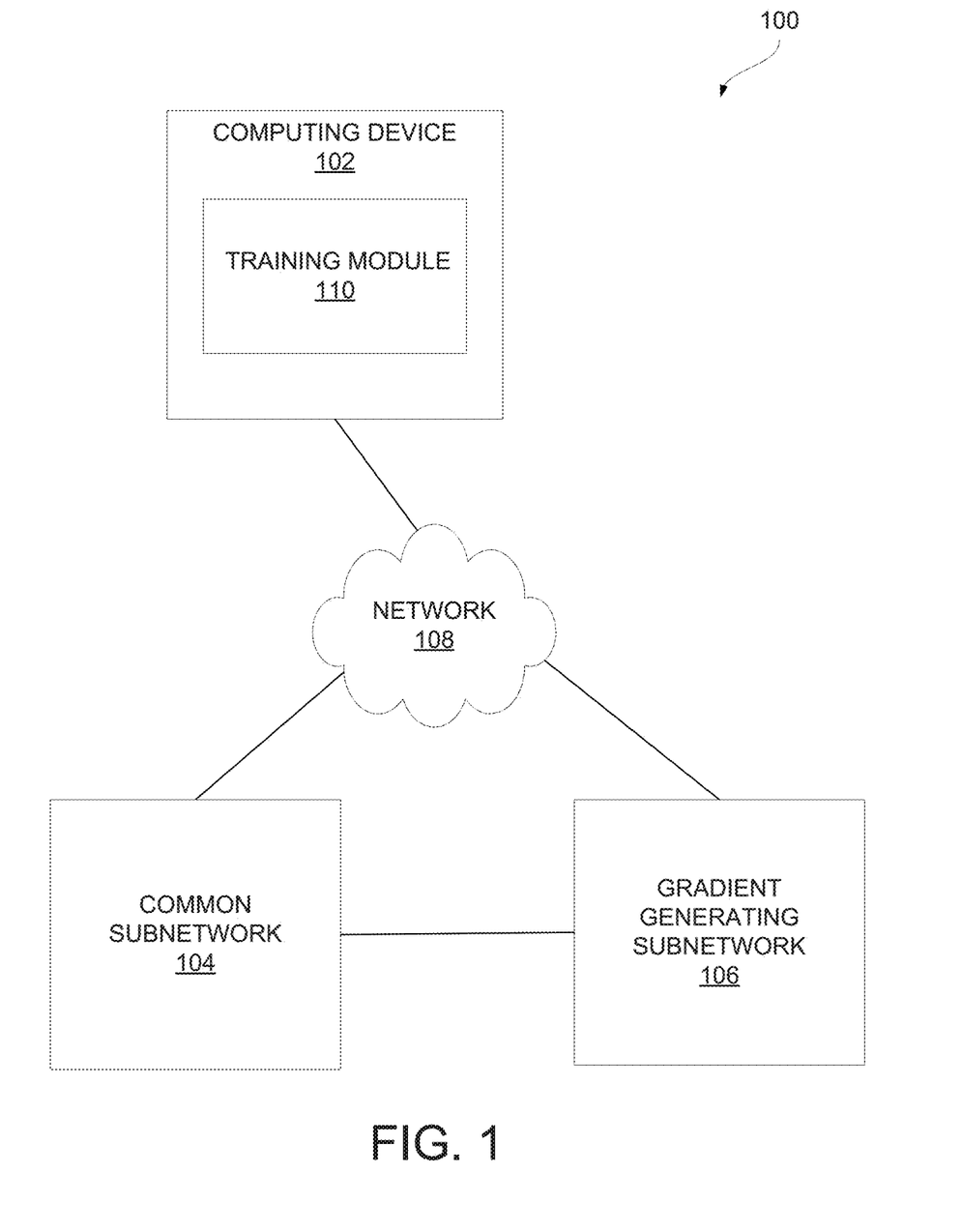
FIG. 1 is a functional block diagram illustrating a training improvement environment, in accordance with an embodiment of the present disclosure.

The present disclosure will now be described in detail with reference to the Figures. FIG. 1 is a functional block diagram illustrating a training improvement environment, generally designated 100, in accordance with an embodiment of the present disclosure.

In the depicted embodiment, training improvement environment 100 includes computing device 102, common subnetwork 104, gradient generating subnetwork 106, and network 108.

In one or more embodiments, common subnetwork 104 may be configured for a main task. In an example, the main task may be a classification or any other task that common subnetwork 104 is configured to do. In one or more embodiments, gradient generating subnetwork 106 may be an additional component to common subnetwork 104 and configured to compute a gradient. Gradient generating subnetwork 106 may be appended to the main task (e.g., a classifier) of common subnetwork 104. Gradient generating subnetwork 106 may be configured to generate, from unlabeled data samples, gradients that help reduce the loss of the main task. In an example, gradient generating subnetwork 106 may include a classifier and a label generator. Both the classifier and the label generator may receive a same input of the gradient generating subnetwork 106. Gradient generating subnetwork 106 may have a cross-entropy loss measuring the quality of predicted labels relative to generated labels. In another example, gradient generating subnetwork 106 may include a weight predicting network, a label-generating algorithm, and a cross-entropy loss, receiving predicted labels of gradient generating subnetwork 106 weighted by weights produced by the weight predicting network. The label-generating algorithm may include a temperature changing function. The label-generating algorithm may receive label predictions. The label-generating algorithm may raise the label predictions to a fixed power. The label-generating algorithm may apply a softmax function for an output normalization. An example of common subnetwork 104 and gradient generating subnetwork 106 is depicted and described in further detail with respect to FIGS. 3-6.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to training module 110 and network 108 and is capable of processing program instructions and executing training module 110, in accordance with an embodiment of the present disclosure. Computing device 102 may include internal and external hardware components, as depicted and described in further detail with respect to FIG. 7.

Further, in the depicted embodiment, computing device 102 includes training module 110. In the depicted embodiment, training module 110 is located on computing device 102. In some embodiments, training module 110 may be located on common subnetwork 104. In some embodiments, training module 110 may be located on gradient generating subnetwork 106. In other embodiments, training module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and training module 110, in accordance with a desired embodiment of the disclosure.

In one or more embodiments, training module 110 is configured to train common subnetwork 104 using labeled data. Common subnetwork 104 may be configured for a main task. In an example, the main task may be a classification or any other task that common subnetwork 104 is configured to do. Labeled data can be a group of samples that have been tagged with one or more labels. For example, a data label might indicate whether a photo contains a certain subject, e.g., a horse or a cow, which words are uttered in an audio recording, what type of action is being performed in a video, what the topic of a news article is, what the overall sentiment of a tweet is, or whether a dot in an X-ray is a tumor. In an example, labeled data may be labeled image samples for training common subnetwork 104. Training module 110 may take the labeled data to train common subnetwork 104. Common subnetwork 104 may be a separately identifiable part of a larger network (e.g., network 108) that may represent a certain limited number of host computers, the hosts in a building or geographic area, or the hosts on an individual local area network. In an example, common subnetwork 104 may be an artificial neural network (e.g., a deep leaning neural network). Common subnetwork 104 may be a supervised neural network with labeled data to train.

In one or more embodiments, training module 110 is configured to compute a loss of common subnetwork 104 based on training with the labeled data. Training module 110 may evaluate the loss of common subnetwork 104 with the network parameters $\theta$ of common subnetwork 104. In an example, a loss measures the performance of common subnetwork 104 (e.g., a classification model) whose output is a probability value between 0 and 1. In an example, the loss may be a cross-entropy loss. Training module 110 may compute the loss of common subnetwork 104 using cross-entropy as the loss function. The loss may be described as the cross-entropy between the training data and the model distribution. The loss, e.g., cross-entropy loss or log loss, may increase as the predicted probability diverges from the actual label. For example, predicting a probability of a small value (e.g., 0.01) when the actual observation label is 1 (true) would be bad and result in a high loss value. A perfect model would have a loss of 0. In an example, a range of possible loss values may be between 0 and 1 given a true observation. As a predicted probability approaches 1, the loss may slowly decrease. As the predicted probability decreases, however, the loss may increase rapidly. A loss may indicate both types of errors, especially those predictions that are confident and wrong.

In one or more embodiments, training module 110 is configured to train gradient generating subnetwork 106 using labelled and unlabeled data. Gradient generating subnetwork 106 may be an additional component to common subnetwork 104 and configured to compute a gradient. Unlabeled data may be a designation for pieces of data that have not been tagged with labels identifying characteristics, properties or classifications. In an example, a gradient may denote the direction of greatest change of a scalar function. The gradient (or gradient vector field) of a scalar function f (x1, x2, x3, ..., xn) may be is denoted $\nabla f$ or $\nabla \rightarrow f$ where $\nabla$ denotes the vector differential operator. Training module 110 may generate in gradient generating subnetwork 106, from unlabeled data, gradients that help reduce the loss of the main task. Training module 110 may take the unlabeled data through gradient generating subnetwork 106 and may use a loss of gradient generating subnetwork 106 to compute the gradient. Training module 110 may perform a network update on common subnetwork 104. Training module 110 may compute again the main loss on the labeled data with the updated network, e.g., common subnetwork 104. Training module 110 may generate useful gradients using unlabeled data. "Usefulness" in this content means that the gradients, propagated from gradient generating subnetwork 106, contribute to reduction of the main objective function ("loss") value of common subnetwork 104. In an example, training module 110 may use backpropagation algorithms to compute the gradient of the loss function with respect to the weights of common subnetwork 104. Training module 110 may update common subnetwork 104 based on a loss of gradient generating subnetwork 106 and a gradient produced via the loss. Training module 110 may compute a training loss based on the labeled and unlabeled data with updated common subnetwork 104. Training module 110 may use the gradient generated by the training loss to update gradient generating subnetwork 106.

In one or more embodiments, training module 110 is configured to compute a gradient using a loss of gradient generating subnetwork 106 based on the unlabeled data. Training module 110 may compute the gradient through the second neural network using the unlabeled data and the loss. Training module 110 may determine a gradient generating loss of gradient generating subnetwork 106 based on the unlabeled data. Training module 110 may use the gradient generating loss to compute the gradient of gradient generating subnetwork 106. Training module 110 may generate, from unlabeled samples, gradients that will help reduce the loss of the main task in common subnetwork 104. Training module 110 may update common subnetwork 104 based on the gradient generating loss and the gradient. Training module 110 may compute again the loss evaluated with the network parameters in common subnetwork 104 after updating common subnetwork 104 using the generated gradient.

In one or more embodiments, training module 110 is configured to update common subnetwork 104 and gradient generating subnetwork 106 with the gradient produced via the gradient generating loss of gradient generating subnetwork 106 based on the unlabeled data. Training module 110 may temporarily update gradient generating subnetwork 106 with the gradient. Training module 110 may update common subnetwork 104 based on the gradient generating loss and the gradient. The gradient generating loss of gradient generating subnetwork 106 may part of some gradient generating subnetwork 106 manifestation. The gradient generating loss of gradient generating subnetwork 106 may not need to be used to train gradient generating subnetwork 106 itself, but rather to generate gradients through gradient generating subnetwork 106.

In one or more embodiments, training module 110 is configured to recompute the main loss of common subnetwork 104 using the labeled data. Training module 110 may compute again the loss evaluated with the network parameters in common subnetwork 104 after updating common subnetwork 104 using the generated gradient. In an example, training module 110 may augment common subnetwork 104 with a self-supervised mechanism capable of generating the gradient using the unlabeled data, the gradient contributing to the reduction of the main loss. Training module 110 may update a weight of a main path for a main task in common subnetwork 104 by propagating the gradient from the gradient generating loss.

In one or more embodiments, training module 110 is configured to compute a training loss based on a difference between the initial main loss and the recomputed main loss of common subnetwork 104. Training module 110 may compute the difference between the recomputed main loss and the initial main loss. Training module 110 may add a fixed positive constant to the difference. Training module 110 may apply a rectified linear unit function to the outcome of the training loss. A rectified linear unit function may be a piecewise linear function that will output an input directly if the outcome is positive, otherwise, the piecewise linear function will output zero. Training module 110 may permanently update gradient generating subnetwork 106 with the gradient based on the training loss. Training module 110 may reduce the loss of common subnetwork 104 by updating common subnetwork 104 based on a gradient produced via a gradient generating loss on the unlabeled data. Training module 110 may reduce the loss of common subnetwork 104 by updating common subnetwork 104 based on the gradient generating loss and the gradient on the unlabeled data. Training module 110 may update common subnetwork 104 based on the gradient generating loss and the gradient. Training module 110 may compute the main loss on the labeled data with the updated common subnetwork. Training module 110 may compute a training loss based on the labeled and unlabeled data with the updated common subnetwork 104. The training loss may be defined in terms of the main loss evaluated with the network parameters before and after updating common subnetwork 104 using the generated gradient. Training module 110 may use the training loss to train the gradient generating subnetwork to the effect of reducing the main loss of common subnetwork 104 with the gradient. In an example, the training loss may be a difference between the two versions of the main loss, measured with and without the gradient generating subnetwork 106 effect. Training module 110 may reduce the training loss with respect to gradient generating subnetwork 106 parameters to generate the reduction of the main loss by means of the update of main network parameters with the gradient that gradient generating subnetwork 104 generates. The gradient generating loss of gradient generating subnetwork 106 is part of some gradient generating subnetwork 106 manifestation. The gradient generating loss of gradient generating subnetwork 106 may not need to be used to train gradient generating subnetwork 106 itself, but rather to generate gradients through gradient generating subnetwork 106. In an example, training module 110 may augment common subnetwork 104 with a self-supervised mechanism capable of generating the gradient using the unlabeled data, the gradient contributing to the reduction of the main loss. Training module 110 may update a weight of a main path for a main task in common subnetwork 104 by propagating the gradient from the gradient generating loss. An example training cycle of training module 110 on common subnetwork 104 and gradient generating subnetwork 106 is depicted and described in further detail with respect to FIGS. 3-4.

Figure 2:
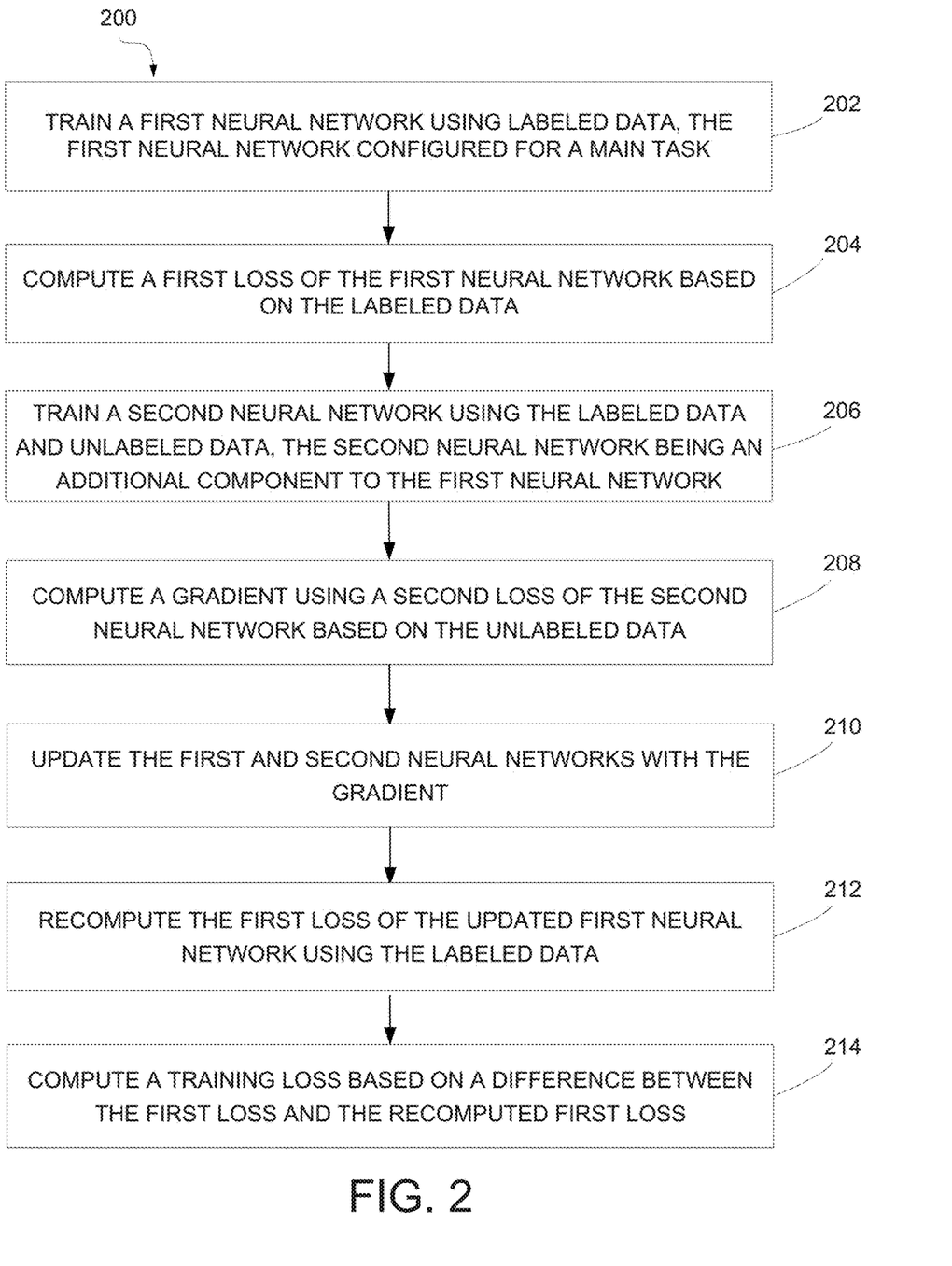
FIG. 2 is a flowchart depicting operational steps of a training module within a computing device of FIG. 1, in accordance with an embodiment of the present disclosure.

FIG. 2 is a flowchart 200 depicting operational steps of training module 110 in accordance with an embodiment of the present disclosure.

Training module 110 operates to train common subnetwork 104 using labeled data. Common subnetwork 104 may be configured for a main task. Training module 110 operates to compute a loss of common subnetwork 104 based on training with the labeled data. Training module 110 may evaluate the loss of common subnetwork 104 with the network parameters θ of common subnetwork 104. Training module 110 operates to train gradient generating subnetwork 106 using labeled and unlabeled data. Gradient generating subnetwork 106 may be an additional component to common subnetwork 104 and configured to compute a gradient. Training module 110 operates to compute a gradient using a loss of gradient generating subnetwork 106 based on the unlabeled data. Training module 110 operates to update common subnetwork 104 and gradient generating subnetwork 106 with the gradient produced via the gradient generating loss of gradient generating subnetwork 106 based on the unlabeled data. Training module 110 operates to recompute the main loss of common subnetwork 104 using the labeled data. Training module 110 operates to compute a training loss based on a difference between the initial main loss and the recomputed main loss of common subnetwork 104. Training module 110 operates to reduce the loss of common subnetwork 104 by updating common subnetwork 104 based on a gradient produced via a gradient generating loss on the unlabeled data.

In step 202, training module 110 trains common subnetwork 104 using labeled data. Common subnetwork 104 may be configured for a main task. In an example, the main task may be a classification or any other task that common subnetwork 104 is configured to do. Labeled data can be a group of samples that have been tagged with one or more labels. For example, a data label might indicate whether a photo contains a certain subject, e.g., a horse or a cow, which words are uttered in an audio recording, what type of action is being performed in a video, what the topic of a news article is, what the overall sentiment of a tweet is, or whether a dot in an X-ray is a tumor. In an example, labeled data may be labeled image samples for training common subnetwork 104. Training module 110 may take the labeled data to train common subnetwork 104. Common subnetwork 104 may be a separately identifiable part of a larger network (e.g., network 108) that may represent a certain limited number of host computers, the hosts in a building or geographic area, or the hosts on an individual local area network. In an example, common subnetwork 104 may be an artificial neural network (e.g., a deep leaning neural network). Common subnetwork 104 may be a supervised neural network with labeled data to train.

In step 204, training module 110 computes a loss of common subnetwork 104 based on training with the labeled data. Training module 110 may evaluate the loss of common subnetwork 104 with the network parameters θ of common subnetwork 104. In an example, a loss measures the performance of common subnetwork 104 (e.g., a classification model) whose output is a probability value between 0 and 1. In an example, the loss may be a cross-entropy loss. Training module 110 may compute the loss of common subnetwork 104 using cross-entropy as the loss function. The loss may be described as the cross-entropy between the training data and the model distribution. The loss, e.g., cross-entropy loss or log loss, may increase as the predicted probability diverges from the actual label. For example, predicting a probability of a small value (e.g., 0.01) when the actual observation label is 1 (true) would be bad and result in a high loss value. A perfect model would have a loss of 0. In an example, a range of possible loss values may be between 0 and 1 given a true observation. As a predicted probability approaches 1, the loss may slowly decrease. As the predicted probability decreases, however, the loss may increase rapidly. A loss may indicate both types of errors, especially those predictions that are confident and wrong.

In step 206, training module 110 trains gradient generating subnetwork 106 using labeled and unlabeled data. Gradient generating subnetwork 106 may be an additional component to common subnetwork 104 and configured to compute a gradient. Unlabeled data may be a designation for pieces of data that have not been tagged with labels identifying characteristics, properties or classifications. In an example, a gradient may denote the direction of greatest change of a scalar function. The gradient (or gradient vector field) of a scalar function $f(x1, x2, x3, \ldots, xn)$ may be is denoted $\nabla f$ or $\nabla \to f$ where $\nabla$ denotes the vector differential operator. Training module 110 may generate in gradient generating subnetwork 106, from unlabeled data, gradients that help reduce the loss of the main task. Training module 110 may take the unlabeled data through gradient generating subnetwork 106 and may use a loss of gradient generating subnetwork 106 to compute the gradient. Training module 110 may perform a network update on common subnetwork 104. Training module 110 may compute again the main loss on the labeled data with the updated network, e.g., common subnetwork 104. Training module 110 may generate useful gradients using unlabeled data. "Usefulness" in this content means that the gradients, propagated from gradient generating subnetwork 106, contribute to reduction of the main objective function ("loss") value of common subnetwork 104. In an example, training module 110 may use backpropagation algorithms to compute the gradient of the loss function with respect to the weights of common subnetwork 104. Training module 110 may update common subnetwork 104 based on a loss of gradient generating subnetwork 106 and a gradient produced via the loss. Training module 110 may compute a training loss based on the labeled and unlabeled data with updated common subnetwork 104. Training module 110 may use the gradient generated by the training loss to update gradient generating subnetwork 106.

In step 208, training module 110 computes a gradient using a loss of gradient generating subnetwork 106 based on the unlabeled data. Training module 110 may compute the gradient through the second neural network using the unlabeled data and the loss. Training module 110 may determine a gradient generating loss of gradient generating subnetwork 106 based on the unlabeled data. Training module 110 may use the gradient generating loss to compute the gradient of gradient generating subnetwork 106. Training module 110 may generate, from unlabeled samples, gradients that will help reduce the loss of the main task in common subnetwork 104. Training module 110 may update common subnetwork 104 based on the gradient generating loss and the gradient. Training module 110 may compute again the loss evaluated with the network parameters in common subnetwork 104 after updating common subnetwork 104 using the generated gradient.

In step 210, training module 110 updates common subnetwork 104 and gradient generating subnetwork 106 with the gradient produced via the gradient generating loss of gradient generating subnetwork 106 based on the unlabeled data. Training module 110 may temporarily update gradient generating subnetwork 106 with the gradient. Training module 110 may update common subnetwork 104 based on the gradient generating loss and the gradient. The gradient generating loss of gradient generating subnetwork 106 may part of some gradient generating subnetwork 106 manifestation. The gradient generating loss of gradient generating subnetwork 106 may not need to be used to train gradient generating subnetwork 106 itself, but rather to generate gradients through gradient generating subnetwork 106.

In step 212, training module 110 recomputes the main loss of common subnetwork 104 using the labeled data. Training module 110 may compute again the loss evaluated with the network parameters in common subnetwork 104 after updating common subnetwork 104 using the generated gradient. In an example, training module 110 may augment common subnetwork 104 with a self-supervised mechanism capable of generating the gradient using the unlabeled data, the gradient contributing to the reduction of the main loss. Training module 110 may update a weight of a main path for a main task in common subnetwork 104 by propagating the gradient from the gradient generating loss.

In step 214, training module 110 computes a training loss based on a difference between the initial main loss and the recomputed main loss of common subnetwork 104. Training module 110 may compute the difference between the recomputed main loss and the initial main loss. Training module 110 may add a fixed positive constant to the difference. Training module 110 may apply a rectified linear unit function to the outcome of the training loss. A rectified linear unit function may be a piecewise linear function that will output an input directly if the outcome is positive, otherwise, the piecewise linear function will output zero. Training module 110 may permanently update gradient generating subnetwork 106 with the gradient based on the training loss. Training module 110 may reduce the loss of common subnetwork 104 by updating common subnetwork 104 based on a gradient produced via a gradient generating loss on the unlabeled data. Training module 110 may update common subnetwork 104 based on the gradient generating loss and the gradient. Training module 110 may compute the main loss on the labeled data with the updated common subnetwork. Training module 110 may compute a training loss based on the labeled and unlabeled data with the updated common subnetwork 104. The training loss may be defined in terms of the main loss evaluated with the network parameters before and after updating common subnetwork 104 using the generated gradient. Training module 110 may use the training loss to train the gradient generating subnetwork to the effect of reducing the main loss of common subnetwork 104 with the gradient. In an example, the training loss may be a difference between the two versions of the main loss, measured with and without the gradient generating subnetwork 106 effect. Training module 110 may reduce the training loss with respect to gradient generating subnetwork 106 parameters to generate the reduction of the main loss by means of the update of main network parameters with the gradient that gradient generating subnetwork 106 generates. The gradient generating loss of gradient generating subnetwork 106 is part of some gradient generating subnetwork 106 manifestation. The gradient generating loss of gradient generating subnetwork 106 may not need to be used to train gradient generating subnetwork 106 itself, but rather to generate gradients through gradient generating subnetwork 106. In an example, training module 110 may augment common subnetwork 104 with a self-supervised mechanism capable of generating the gradient using the unlabeled data, the gradient contributing to the reduction of the main loss. Training module 110 may update a weight of a main path for a main task in common subnetwork 104 by propagating the gradient from the gradient generating loss.

Figure 3:
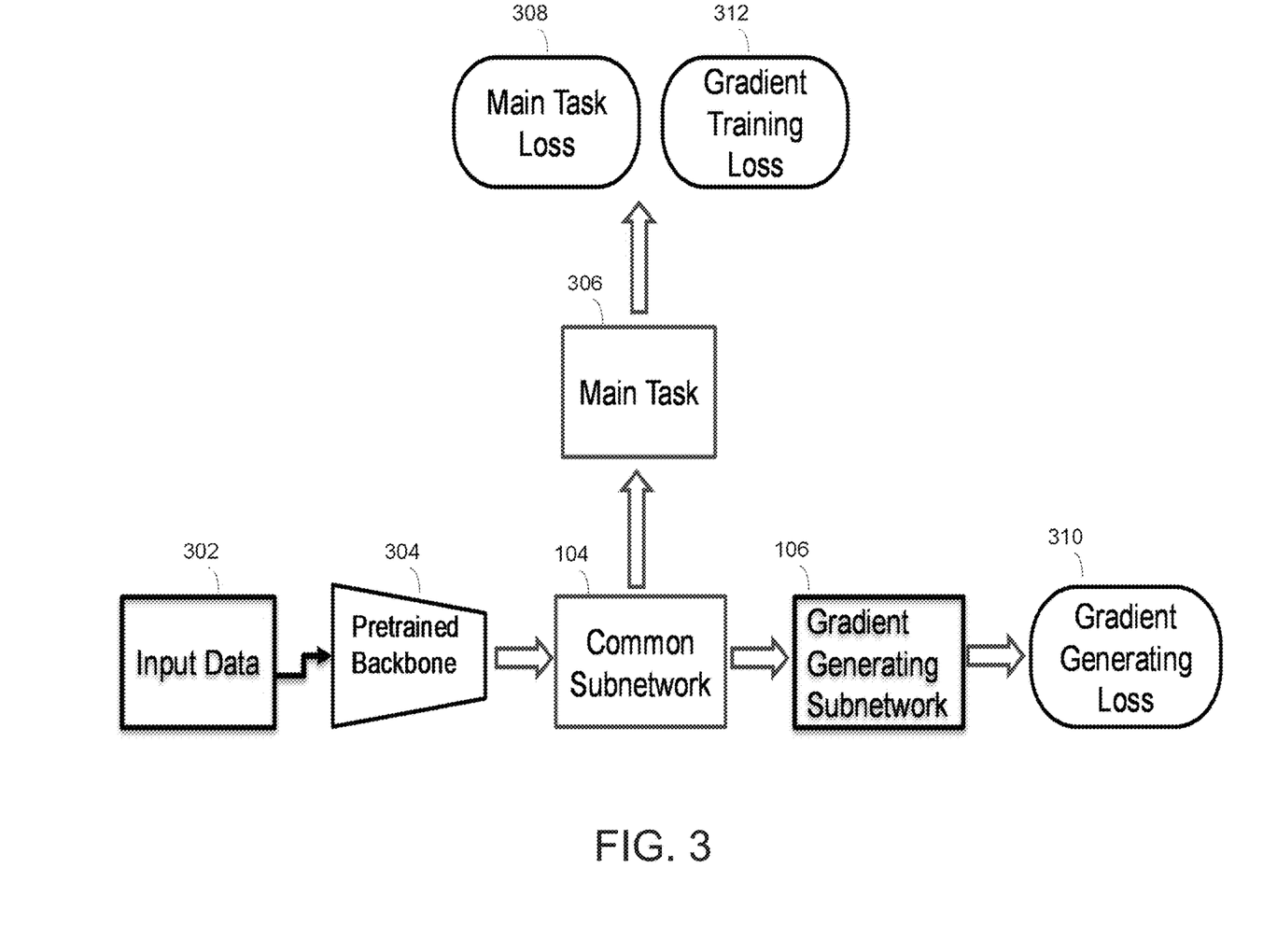
FIG. 3 illustrates an exemplary schematic network architecture of the training module with a common subnetwork and a gradient generating subnetwork of FIG. 1, in accordance with one or more embodiments of the present disclosure.

FIG. 3 illustrates an exemplary schematic network architecture of training module 110 in common subnetwork 104 and gradient generating subnetwork 106 in accordance with one or more embodiments of the present disclosure.

In the example of FIG. 3, pretrained backbone 304 receive input data 302 to train common subnetwork 104 and gradient generating subnetwork 106. Pretrained backbone 304 may interconnect pieces of various networks, providing a path for the exchange of information between subnetworks (e.g., common subnetwork 104 and gradient generating subnetwork 106). Pretrained backbone 304 may carry the bulk of the network traffic. Input data 302 may be data samples to train common subnetwork 104 and gradient generating subnetwork 106. Input data 302 may be labeled data. Input data 302 may be unlabeled data. Input data 302 may be combination of labeled data and unlabeled data. In an example, input data 302 may be image data samples. Common subnetwork 104 may be configured for main task 306. In an example, main task 306 may be a classification or any other task that common subnetwork 104 may be configured to do. Main task 306 may include a separate, smaller model as a main task head. Training module 110 may compute main task loss 308 of common subnetwork 104 based on training with input data 302 (e.g., labeled data). In an example, main task loss 308 may be a cross-entropy loss for main task 306. Training module 110 may compute gradient training loss 312 based on input data 302 with the updated common subnetwork 104. Gradient training loss 312 may be defined in terms of main task loss 308 evaluated with the network parameters θ before and after updating common subnetwork 104 using generated gradient from gradient generating subnetwork 106.

Gradient generating subnetwork 106 may be an additional component to common subnetwork 104 and configured to compute a gradient. Training module 110 may determine gradient generating loss 310 of gradient generating subnetwork 106 based on input data 302 (e.g., unlabeled data). Training module 110 may use gradient generating loss 310 to compute the gradient of gradient generating subnetwork 106. Training module 110 may generate, from unlabeled data samples, gradients that will help reduce main task loss 306 in common subnetwork 104.

Figure 4:
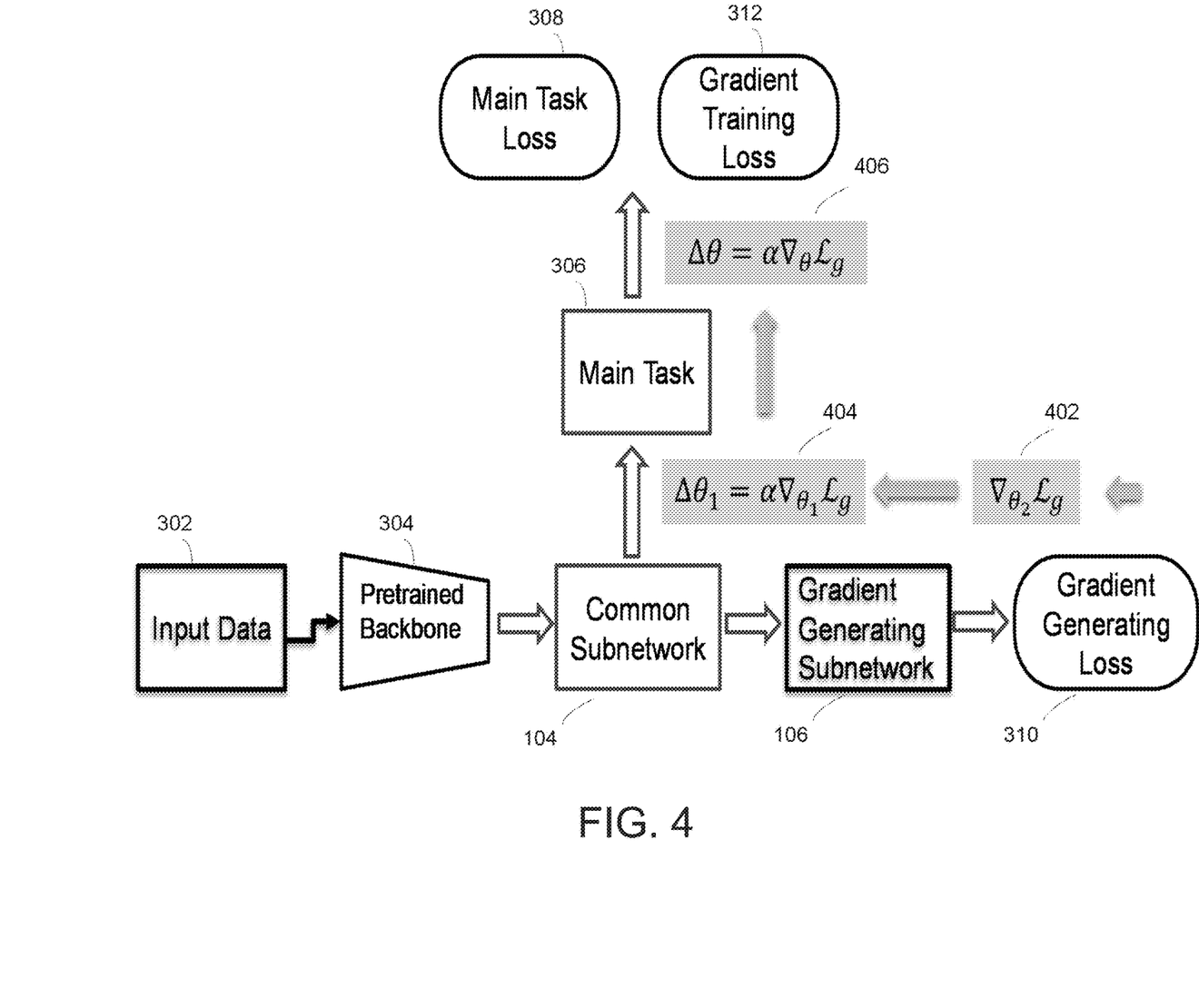
FIG. 4 illustrates an example training cycle of the exemplary schematic network architecture of the training module with the common subnetwork and the gradient generating subnetwork in FIG. 3, in accordance with one or more embodiments of the present disclosure.

FIG. 4 illustrates an example training cycle of the exemplary schematic network architecture of training module 110 in common subnetwork 104 and gradient generating subnetwork 106 in FIG. 3, in accordance with one or more embodiments of the present disclosure.

In the example of FIG. 4, generated gradients (denoted as, e.g., $\nabla_{\theta_2} \mathcal{L}_g$ 402) flow through gradient generating subnetwork 106 and affect common subnetwork 104 with $\Delta\theta_1 = \alpha \nabla_{\theta_1} \mathcal{L}_g$ 404. $\theta_2$ represents network parameters for gradient generating subnetwork 106. $\theta_1$ represents network parameters for common subnetwork 104. $\alpha$ may be a predefined constant. $\mathcal{L}_g$ is gradient generating loss. Training module 110 may compute gradient training loss 312 based on input data 302 with the updated common subnetwork 104. Gradient training loss 312 may be defined in terms of main task loss 308 evaluated with the network parameters θ before and after updating common subnetwork 104 using generated gradient $\Delta\theta = \alpha \nabla_\theta \mathcal{L}_g$ 406. Training module 110 may use gradient training loss 312 to train the gradient generating subnetwork to the effect of reducing main task loss 308 of common subnetwork 104. Specifically, gradient training loss 312 may be a restricted difference between the two versions of main task loss 308, measured with and without gradient generating subnetwork 106 effect. For example, gradient training loss 312 of gradient generating subnetwork 106 can be represented as $\mathcal{L}_{GN}=[m+\mathcal{L}_M(\theta_g)-\mathcal{L}_M(\theta)]$. $\theta_g$ is updated common subnetwork 104 as $\theta_g=\theta+\alpha\nabla_\theta\mathcal{L}_g$. $\mathcal{L}_M(\theta)$ is loss with original network (e.g., original common subnetwork 104 without gradient update). $\mathcal{L}_M(\theta_g)$ is loss with g-updated network (e.g., updated common subnetwork 104 with gradient update). m may be a predefined constant. Training module 110 may reduce training loss $\mathcal{L}_{GN}$ with respect to gradient generating subnetwork 106 parameters to generate the reduction of main task loss 308 by means of the update of main network parameters with the gradient that gradient generating subnetwork 106 generates. Gradient generating loss $\mathcal{L}_g$ of gradient generating subnetwork 106 is part of gradient generating subnetwork 106, however, gradient generating loss $\mathcal{L}_g$ of gradient generating subnetwork 106 may not need to be used to train gradient generating subnetwork 106 itself, but rather to generate gradients through gradient generating subnetwork 106.

Figure 5:
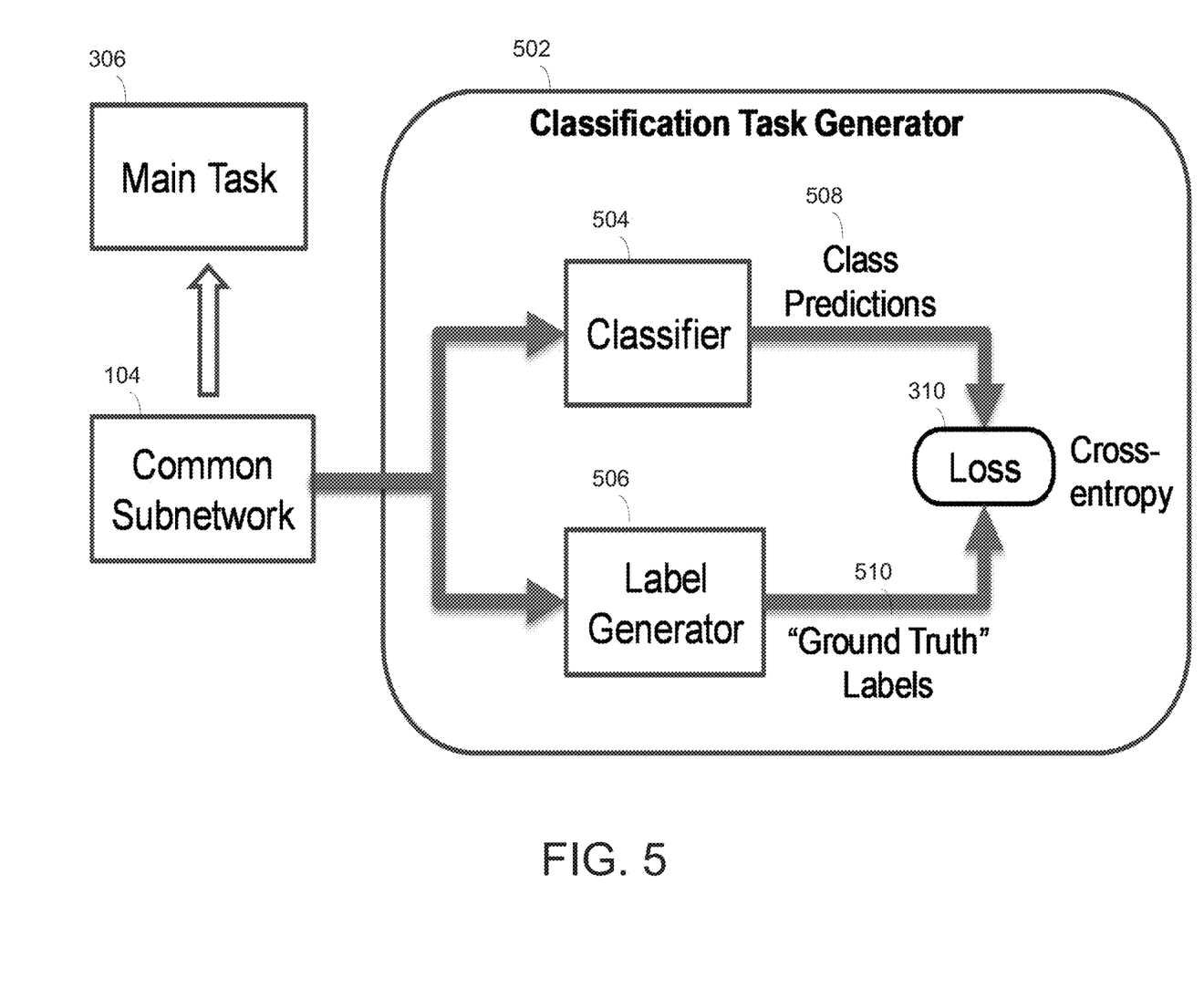
FIG. 5 illustrates an exemplary gradient generating subnetwork of FIG. 3, in accordance with one or more embodiments of the present disclosure.

FIG. 5 illustrates an exemplary gradient generating subnetwork 106 in accordance with one or more embodiments of the present disclosure.

In the example of FIG. 5, classification task generator 502 is an exemplary gradient generating subnetwork 106. Classification task generator 502 may be a self-supervised classification task generator. Classification task generator 502 may include two subnetworks (e.g., classifier 504 and label generator 506). Training module 110 may provide unlabeled data (e.g., unlabeled image) for classification task generator 502. Classifier 504 may predict class 508 probabilities for unlabeled data. Label generator 506 may play the role of an oracle providing "ground truth" labels 510 for the unlabeled data. Training module 110 may make no attempt to train the subnetworks to perform according to the job descriptions given. Training module 110 may perform the only training using $\mathcal{L}_{GN}$ defined above. Training module 110 may train the subnetworks (e.g., classifier 504 and label generator 506) towards producing useful gradients, rather than to minimize gradient generating loss 310 of classification task generator 502.

Figure 6:
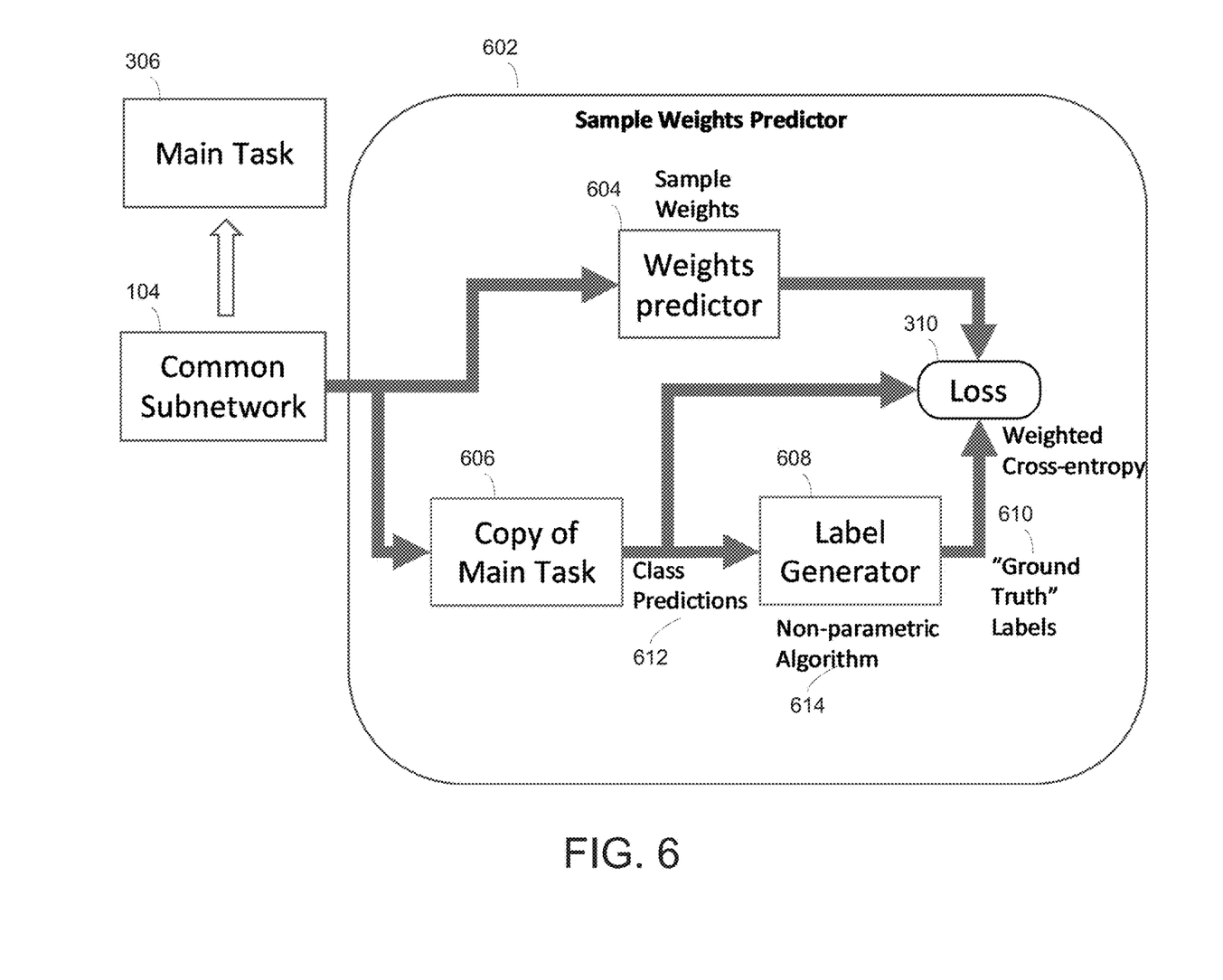
FIG. 6 illustrates an exemplary gradient generating subnetwork of FIG. 3, in accordance with one or more embodiments of the present disclosure.

FIG. 6 illustrates an exemplary gradient generating subnetwork 106 in accordance with one or more embodiments of the present disclosure.

In the example of FIG. 6, sample weights predictor 602 is an exemplary gradient generating subnetwork 106. Sample weights predictor 602 may be a self-supervised network which learns to produce confidence scores (weights) for batch samples. In the example, sample weights predictor 602 includes weights predictor 604, copy of main task 606 (e.g., a classification head), and label generator 608. Weight predictor 604 may learn from unlabeled data. Copy of main task 606 may produce class predictions 612 (in case the main task is classification). Label generator 608 may obtain ground truth labels 610 using non-parametric algorithm 614 (for instance, by raising class predictions 612 to some power p>1 and applying a minimal probability threshold). Weights predictor 604 may learn to provide weights that would improve the classification via gradient generating loss 310 (e.g., a cross-entropy loss), thus assigning higher weights to samples with more confident in. Training module 110 may not attempt to achieve a good performing system but may just produce a viable learning system producing gradients. Training module 110 may train to optimize gradient generating subnetwork 106 for the usefulness of gradients for main task 306. Label generator 608 can work by raising class predictions 612 to some power and renormalizing. Weights predictor 604 may emphasize useful samples to help the final cause for main task 306.

Figure 7:
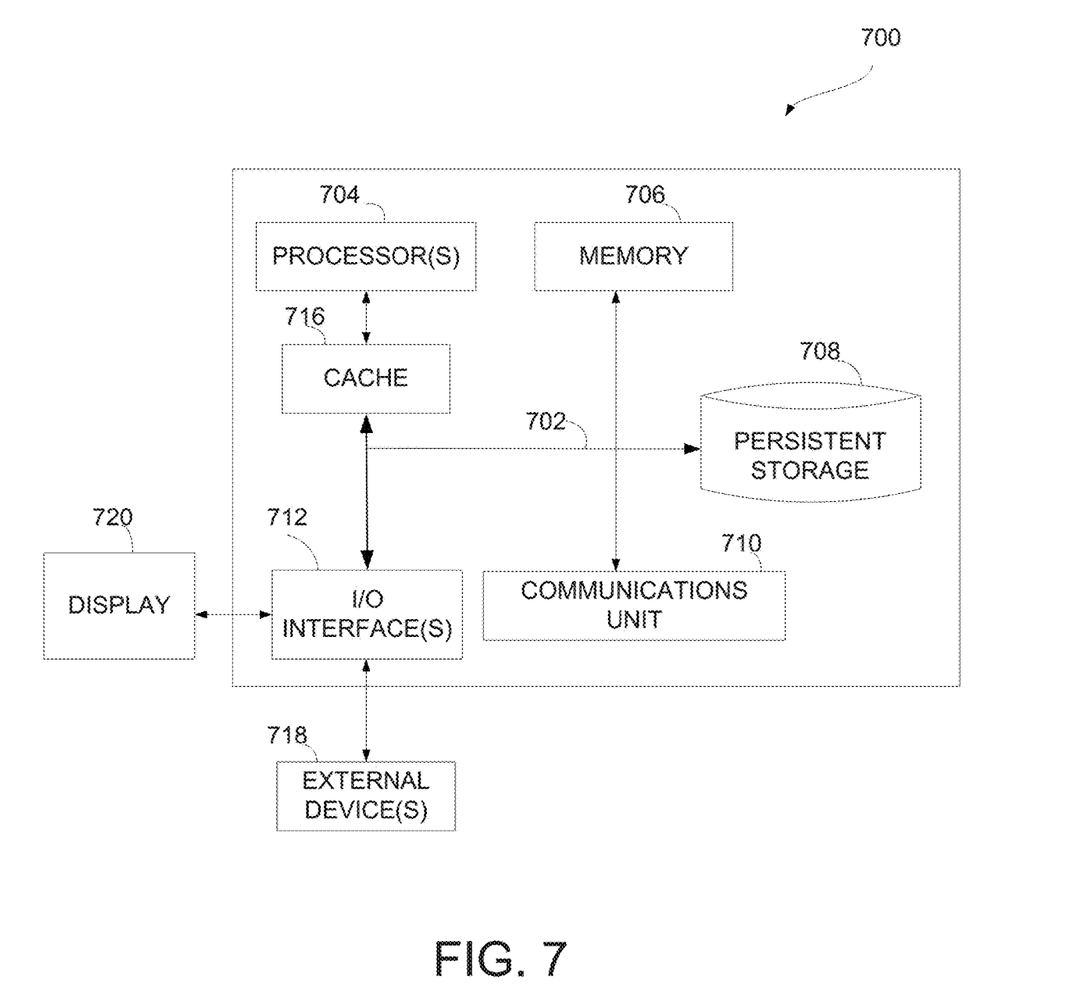
FIG. 7 is a block diagram of components of the computing device within FIG. 1, in accordance with an embodiment of the present disclosure.

FIG. 7 depicts a block diagram 700 of components of computing device 102 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environment may be made.

Computing device 102 may include communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Training module 110 may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Training module 110 may be downloaded to persistent storage 708 through communications unit 710.

I/O interface(s) 712 allows for input and output of data with other devices that may be connected to computing device 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., training module 110 can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
training a common subnetwork of a neural network to perform a main task using labeled data, the neural network comprising a main task head subnetwork, the common subnetwork, and a gradient generating subnetwork, wherein the main task head subnetwork receives input from the common subnetwork;
determining a first loss for performing the main task using the trained common subnetwork and the main task head subnetwork;
computing a gradient using unlabeled data via the trained common subnetwork and the gradient generating subnetwork, the gradient generating subnetwork comprising a classifier subnetwork and a label generator subnetwork, both the classifier subnetwork and the label generator subnetwork receiving a same input from the trained common subnetwork;
updating the trained common subnetwork using the gradient;
determining a second loss for performing the main task using the trained common subnetwork and the main task head subnetwork after the updating;
determining a gradient training loss based on the first loss and the second loss; and
training the neural network based on the gradient training loss.

2. The method of claim 1, wherein determining the gradient training loss comprises:
computing a difference between the second loss and the first loss; and
adding a fixed positive constant to the difference, wherein the method further comprises applying a rectified linear unit function to the gradient training loss.

3. The method of claim 1, wherein computing the gradient comprises:
determining a gradient generating loss based on outputs of the classifier and the label generator; and
computing the gradient based on the gradient generating loss.

4. A computer program product comprising:
one or more computer readable storage media; and
program instructions stored on the one or more computer readable storage media to perform operations comprising:
training a common subnetwork of a neural network to perform a main task using labeled data, the neural network comprising a main task head subnetwork, the common subnetwork, and a gradient generating subnetwork, wherein the main task head subnetwork receives input from the common subnetwork;
determining a first loss for performing the main task using the trained common subnetwork and the main task head subnetwork;
computing a gradient using unlabeled data via the trained common subnetwork and the gradient generating subnetwork, the gradient generating subnetwork comprising a classifier subnetwork and a label generator subnetwork, both the classifier subnetwork and the label generator subnetwork receiving a same input from the trained common subnetwork;
updating the trained common subnetwork using the gradient;
determining a second loss for performing the main task using the trained common subnetwork and the main task head subnetwork after the updating;
determining a gradient training loss based on the first loss and the second loss; and
training the neural network based on the gradient training loss.

5. The computer program product of claim 4, wherein determining the gradient training loss comprises:
computing a difference between the second loss and the first loss; and
adding a fixed positive constant to the difference, wherein the operations further comprise applying a rectified linear unit function to the gradient training loss.

6. The computer program product of claim 4, wherein computing the gradient comprises:
determining a gradient generating loss based on outputs of the classifier and the label generator; and
computing the gradient based on the gradient generating loss.

7. A computer system comprising:
one or more processors, one or more computer readable storage media, and program instructions stored on the one or more computer readable storage media for execution by at least one of the one or more processors to perform operations comprising:
training a common subnetwork of a neural network to perform a main task using labeled data, the neural network comprising a main task head subnetwork, the common subnetwork, and a gradient generating subnetwork, wherein the main task head subnetwork receives input from the common subnetwork;
determining a first loss for performing the main task using the trained common subnetwork and the main task head subnetwork;
computing a gradient using unlabeled data via the trained common subnetwork and the gradient generating subnetwork, the gradient generating subnetwork comprising a classifier subnetwork and a label generator subnetwork, both the classifier subnetwork and the label generator subnetwork receiving a same input from the trained common subnetwork;
updating the trained common subnetwork using the gradient;

determining a second loss for performing the main task using the trained common subnetwork and the main task head subnetwork after the updating;

determining a gradient training loss based on the first loss and the second loss; and training the neural network based on the gradient training loss.

8. The computer system of claim 7, wherein determining the gradient training loss comprises:

computing a difference between the second loss and the first loss; and adding a fixed positive constant to the difference, wherein the operations further comprise applying a rectified linear unit function to the gradient training loss.

9. The computer system of claim 7, wherein computing the gradient comprises:

determining a gradient generating loss based on outputs of the classifier and the label generator; and computing the gradient based on the gradient generating loss.

* * * * *